(12) United States Patent
Nagasawa (10) Patent No.: US 11,716,604 B2
(45) Date of Patent: Aug. 1, 2023

(54) INCONSISTENCY-DETERMINING APPARATUS FOR VEHICLE ACCIDENT

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 120 days.

(21) Appl. No.: 17/476,150

(22) Filed: Sep. 15, 2021

(65) Prior Publication Data

US 2022/0103994 A1   Mar. 31, 2022

(30) Foreign Application Priority Data

Sep. 25, 2020 (JP) ................................ 2020-160364

(51) Int. Cl.
*H04W 4/90* (2018.01)
*H04W 4/44* (2018.01)

(52) U.S. Cl.
CPC ............. *H04W 4/90* (2018.02); *H04W 4/44* (2018.02)

(58) Field of Classification Search
None
See application file for complete search history.

(56) References Cited

U.S. PATENT DOCUMENTS

| 10,194,484 | B2 * | 1/2019 | Lucero | H04W 4/80 |
| 10,276,046 | B2 * | 4/2019 | Fujisawa | G06V 20/52 |
| 10,311,728 | B2 * | 6/2019 | Stenneth | G08G 1/096741 |

FOREIGN PATENT DOCUMENTS

JP    2001-216588 A    8/2001

* cited by examiner

*Primary Examiner* — Ernest G Tacsik
(74) *Attorney, Agent, or Firm* — McDermott Will & Emery LLP (57) ABSTRACT

An inconsistency-determining apparatus in an emergency notification system in which emergency information about a vehicle accident is able to be transmitted from each of the vehicles that have accidents includes an acquisition unit configured to acquire information about a number of times each of the vehicles collides or information with which the number of times is able to be specified, as emergency information about the vehicles that have the accidents, a counter configured to count the number of times each of the vehicles that have the accidents collides, a comparator configured to compare the number of times one of the vehicles that have the accidents collides with that of another thereof, and a generation unit configured to generate an inconsistency comparison result representing a possibility that an unknown vehicle having a collision exists when there is inconsistency in the number of times the vehicles that have the accidents collide.

9 Claims, 7 Drawing Sheets

FIG. 8A
 ⇨ CONSISTENCY

FIG. 8B
 ⇨ INCONSISTENCY (WARNING)

FIG. 8C
 ⇨ INCONSISTENCY (WARNING)

TIME

FIG. 8D
 ⇨ INCONSISTENCY (WARNING)

INCONSISTENCY-DETERMINING APPARATUS FOR VEHICLE ACCIDENT

CROSS-REFERENCE TO RELATED APPLICATIONS

The present application claims priority from Japanese Patent Application No. 2020-160364 filed on Sep. 25, 2020, the entire contents of which are hereby incorporated by reference.

BACKGROUND

The disclosure relates to an inconsistency-determining apparatus for a vehicle accident.

In the case where an accident occurs, it is thought that a vehicle such as an automobile gives an emergency notification of the accident. For example, an emergency notification system is used practically in an automobile. The emergency notification system of an automobile that has an accident transmits, to a server apparatus in a call center, emergency information on the accident such as the operating state of an occupant protection device in the accident, position, the direction in which an impact is taken in the accident, and the intensity of the impact by using an automatic notification device that is disposed in the automobile (Japanese Unexamined Patent Application Publication No. 2001-216588). In the call center, the emergency information on the accident of the automobile that is received by the server apparatus is checked, and a medical helicopter or a first aid squad is requested to be dispatched. This enables emergency dispatch based on the information on the accident, and consequently, there is an increased possibility that a person who has the accident is saved.

SUMMARY

An aspect of the disclosure provides an inconsistency-determining apparatus for a vehicle accident. The inconsistency-determining apparatus is to be disposed in an emergency notification system in which emergency information about a vehicle accident is able to be transmitted from each of vehicles that have accidents. The inconsistency-determining apparatus includes an acquisition unit, a counter, a comparator, and a generation unit. The acquisition unit is configured to acquire information about a number of times each of the vehicles collides or information with which the number of times is able to be specified, as emergency information about the vehicles that have the accidents. The counter is configured to count the number of times each of the vehicles that have the accidents collides. The comparator is configured to compare the number of times one of the vehicles that have the accidents collides with the number of times of another of the vehicles that have the accidents collides. The generation unit is configured to generate an inconsistency comparison result representing a possibility that an unknown vehicle having a collision exists in a case where there is inconsistency in the number of times the vehicles that have the accidents collide.

An aspect of the disclosure provides an inconsistency-determining apparatus for a vehicle accident. The inconsistency-determining apparatus is to be disposed in an emergency notification system in which emergency information about a vehicle accident is able to be transmitted from each of vehicles that have accidents. The inconsistency-determining apparatus includes circuitry. The circuitry is configured to acquire information about a number of times each of the vehicles collides or information with which the number of times is able to be specified, as emergency information about the vehicles that have the accidents. The circuitry is configured to count the number of times each of the vehicles that have the accidents collides. The circuitry is configured to compare the number of times one of the vehicles that have the accidents collides with the number of times of another of the vehicles that have the accidents collides. The circuitry is configured to generate an inconsistency comparison result representing a possibility that an unknown vehicle having a collision exists in a case where there is inconsistency in the number of times the vehicles that have the accidents collide.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

There is a possibility that the server apparatus cannot accurately determine a status such as the scale of the accident by merely transmitting the emergency information on the accident from each automobile that has the accident to the server apparatus.

For example, there is a possibility that at least one of the automobiles that have the accidents does not include the automatic notification device that transmits the emergency information to the server apparatus, or the automatic notification device malfunctions due to, for example, the accident. In this case, there is a possibility that the server apparatus cannot receive the emergency information on the accident from the automobile that has the accident. Thus there is a possibility that the server apparatus cannot determine the scale of the accident and cannot acquire information about the automobile that has the accident.

Basically, the automatic notification device automatically transmits the emergency information when a collision is detected. In the case where multiple collisions occur, the automatic notification device transmits the emergency information multiple times for every collision. The automatic notification device may be unable to grasp the sequence of multiple accidents or the final state of each automobile without checking a timestamp about the emergency information.

Even when the emergency information on the accident in which the plural automobiles are involved can be acquired from each of the automobiles, the automatic notification device cannot determine how the automobiles have the accident or the state or scale of the accident by using this as it is.

It is desirable that the emergency notification system is to be capable of determining the status of the accident with more certainty.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
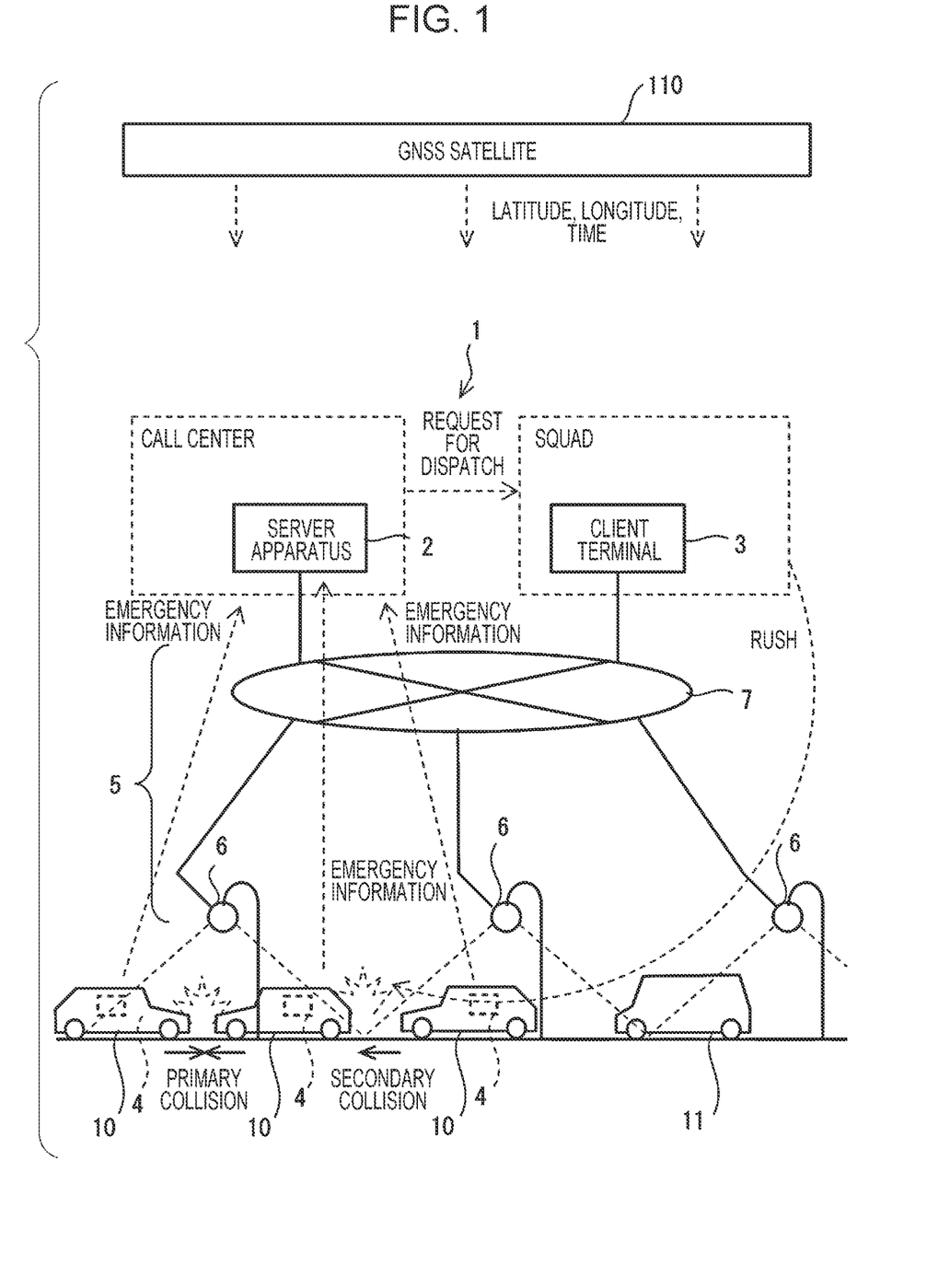
FIG. 1 illustrates an example of an emergency notification system according to an embodiment of the disclosure.

FIG. 1 illustrates an example of an emergency notification system 1 according to the embodiment of the disclosure.

The emergency notification system 1 in FIG. 1 includes a server apparatus 2 that is used in a call center of an institution that manages road accidents of, for example, automobiles 10, a client terminal 3 that is used by a life-saving squad such as a fire department, automatic notification devices 4 that are disposed in the automobiles 10, and a wireless communication network 5 for providing a communication line to these. The wireless communication network 5 includes base stations 6 for communication with wireless terminals such as the automatic notification devices 4, for example, base stations that are disposed along a road and that are dispersed in areas, and a communication network 7 via which the base stations 6 are coupled to each other. The base stations 6 function as access points to which the wireless terminals that can communicate with each other in a zone are coupled. The server apparatus 2 in the call center and the client terminal 3 of the life-saving squad are coupled to the communication network 7 in FIG. 1. Examples of the emergency notification system 1 includes an advanced automatic collision notification (AACN). In the system of AACN, when an accident occurs, information on the accident is automatically and immediately transmitted from the automobiles 10 that have the accidents to the server apparatus 2 in the call center, and the life-saving squad dispatches an ambulance 11 or a medical helicopter, based on a request for dispatch from the call center. The call center can select the life-saving squad depending on the status of the accident and request the life-saving squad to be dispatched. The ambulance 11 or the medical helicopter can be dispatched to the site of the accident with the status of the accident grasped. Consequently, an appropriate life-saving treatment can be immediately in short lead time provided to a person who has the accident.

FIG. 1 illustrates an example of the emergency notification system 1 to be used by organizations in collaboration with each other. However, the emergency notification system 1 may be used by a single manager of areas including roads on which each automobile 10, for example, can pass such as police, a fire department, a public office, a hospital, a medical institution, a security company, or a management company.

FIG. 1 also illustrates GNSS satellites. The apparatus and the devices in FIG. 1 can acquire the position thereof and time by receiving radio waves of the GNSS satellites including position information about the latitude and longitude and time information. The apparatus and the devices receive radio waves from the GNSS satellites in cooperation with each other and can consequently match the current time and so on with high precision. The common time can be used.

In some cases, the accident of the automobile 10 is not simple unlike other accidents such as a train accident.

In some examples, as illustrated in FIG. 1, some automobiles 10 have a primary collision, and another automobile 10 has a secondary collision against the automobiles 10. In the case where such multiple collisions occur, there is a possibility that the state of each automobile 10 that has the accident and the state of an occupant greatly differ from those that can be first predicted for the primary collision. In addition, there is a possibility that at least one of the automatic notification devices 4 of the automobiles 10 that have the primary collision malfunctions due to the primary collision or malfunctions before the primary collision. The automobile 10 that has the multiple accidents and that includes the malfunctioning automatic notification device 4 is not able to transmit at least emergency information about the secondary collision. In the case where the automobiles 10 have the accidents at the same location, there is a possibility that communication with the base station 6 is broken down due to a lack of the communication capability, and that at least one of the automatic notification devices 4 of the automobiles 10 cannot transmit the emergency information.

Other than this, for example, there is a possibility that the automobile 10 that has the primary collision on the left side in FIG. 1 is wrecked by the primary collision or falls down from a road. The automobile 10 cannot transmit the emergency information at all.

In the case where the emergency information about all of the collisions cannot be acquired from all of the automobiles 10 that have the accidents, the server apparatus 2 cannot determine the scale of the accidents and cannot acquire information about the automobiles 10 that have the accidents.

Basically, each automatic notification device 4 automatically transmits the emergency information whenever the single collision is detected. In the case where the multiple collisions occur, the automatic notification device 4 transmits the emergency information multiple times for respective collisions. The automatic notification device 4 cannot grasp the order of received pieces of the emergency information or the final state of the automobile 10 without checking the timestamp about the emergency information.

Even when the emergency information on the accident in which the automobiles 10 are involved can be acquired from the automobiles 10, each automatic notification device 4 cannot determine how the automobiles 10 have the accident or the state or scale of the accident by using this as it is.

The emergency notification system 1 for the automobiles 10 is to be improved. The emergency notification system 1 is to be capable of determining the status of the accident with more certainty.

Figure 2:
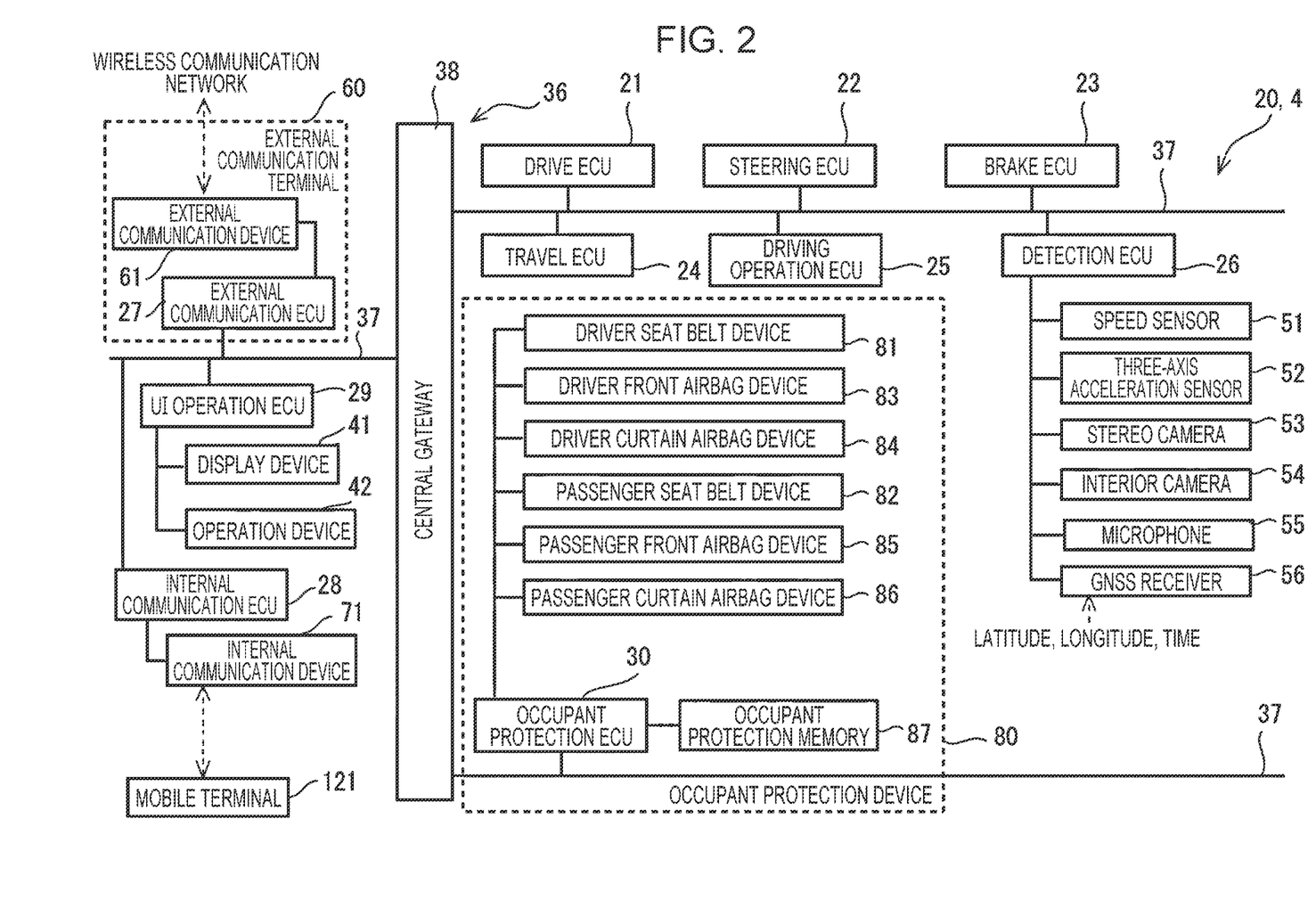
FIG. 2 illustrates a control system of an automobile that can function as an automatic notification device that transmits emergency information in the automobile that has an accident in FIG. 1.

FIG. 2 illustrates a control system of each automobile 10 that can function as the automatic notification device 4 that transmits the emergency information in the automobile 10 that has the accident in FIG. 1.

A control system 20 in the automobile 10 in FIG. 2 is representatively illustrated as electronic control units (ECUs) into which respective control devices are incorporated. The control devices may include, in addition to the ECUs, for example, a memory that stores a control program and data, input and output ports that are coupled to an object to be controlled or a state detection device thereof, a timer for measuring a period or time, and an internal bus to which these are coupled.

In one example, the ECUs illustrated in FIG. 2 include a drive ECU 21, a steering ECU 22, a brake ECU 23, a travel ECU 24, a driving operation ECU 25, a detection ECU 26, an external communication ECU 27, an internal communication ECU 28, an UI operation ECU 29, and an occupant protection ECU 30. The control system 20 of the automobile 10 may include another ECU not illustrated.

The ECUs are coupled to an automobile network 36 that is used in the automobile 10 such as a controller area network (CAN) or a local interconnect network (LIN). The automobile network 36 may include bus cables 37 to which the ECUs can be coupled and a central gateway (CGW) 38 that serves as a relay device to which the bus cables 37 are coupled. Different IDs are assigned as identification information to the ECUs. Basically, each of the ECUs periodically outputs data to another ECU. The ID of the ECU that outputs the data and the ID of the other ECU to which the data is outputted are added into the data. The other ECU monitors the bus cable 37. In the case where the ID of the ECU to which the data is outputted is, for example, its own ID, the ECU acquires the data and performs a process based on the data. The central gateway 38 monitors the coupled bus cables 37. When the central gateway 38 detects an ECU that is coupled to the bus cable 37 that is different from the bus cable 37 for the ECU that outputs the data, the central gateway 38 outputs the data to the different bus cable 37. Such a relay process of the central gateway 38 enables each ECU to receive and output the data from and to the other ECUs that are coupled to the bus cables 37 that differ from the bus cable 37 to which the ECU is coupled.

User interface devices for an occupant on board are coupled to the UI operation ECU 29, and examples thereof include a display device 41 and an operation device 42. Examples of the display device 41 may include a liquid-crystal device and an image projection device. Examples of the operation device 42 may include a touch screen, a keyboard, and a non-contact operation detection device. For example, the display device 41 and the operation device 42 may be installed on an inner surface in an automobile cabin in which the occupant gets in. The UI operation ECU 29 acquires data from the automobile network 36 and causes the display device 41 to display the data. The UI operation ECU 29 outputs an operation that is inputted into the operation device 42 to the automobile network 36. The UI operation ECU 29 may perform a process based on the inputted operation and may add the result of the process into the data. For example, the UI operation ECU 29 may cause the display device 41 to display a navigation screen for setting a destination, may search for a path to the destination that is selected by the inputted operation, and may add path data into the data. The path data may contain attribution information about a road such as a lane that is used for movement from the current position to the destination.

A steering wheel, a brake pedal, an accelerator pedal, and a shift lever that serve as operation members for the occupant to control the travelling automobile 10 and that are not illustrated, for example, are coupled to the driving operation ECU 25. When the operation members are operated, the driving operation ECU 25 outputs data containing the presence/absence of an operation and a manipulated variable to the automobile network 36. The driving operation ECU 25 may perform a process related to the operation of each operation member and may add the result of the process into the data. For example, in the case where the accelerator pedal is operated because another moving body or a stationary object exists in the direction in which the automobile 10 travels, the driving operation ECU 25 may determine whether the operation is abnormal and may add the result of determination into the data.

Detection members for detecting the state of the travelling automobile 10 are coupled to the detection ECU 26, and examples thereof include a speed sensor 51 that detects the speed of the automobile 10, a three-axis acceleration sensor 52 that detects the acceleration of the automobile 10, a stereo camera 53 that images surroundings outside the automobile 10, an interior camera 54 that images the occupant in the automobile cabin, a microphone 55 that converts sounds inside and outside the interior into data, and a GNSS receiver 56 that detects the position of the automobile 10. The GNSS receiver receives the radio waves from GNSS satellites 110 and acquires the current position of the automobile that is represented by the latitude and longitude and the current time. The detection ECU 26 acquires detection information from the detection members and outputs data containing the detection information to the automobile network 36. The detection ECU 26 may perform a process based on the detection information and may add the result of the process into the data. For example, in the case where the three-axis acceleration sensor 52 detects acceleration more than a collision detection threshold, the detection ECU 26 may determine collision detection and may add the result of the collision detection into the data. The detection ECU 26 may identify an object near the automobile such as a pedestrian, another automobile 10, a roadside tree, a utility pole, or a guardrail, based on the image of the stereo camera 53, may determine the kind and attributes of the object, may predict the relative direction and relative distance of the object and a movement direction if the object moves depending on the position or size of the object or a change in the object in the image, may add information about a forecast for a collision with another object including the result of prediction into the data, and may output the data to the automobile network 36.

An external communication device 61 is coupled to the external communication ECU 27. The external communication device 61 wirelessly communicates with the base station 6 of the wireless communication network 5 near the automobile 10. The external communication ECU 27 transmits and receives data to and from the server apparatus 2 via the wireless communication network 5 by using wireless communication between the external communication device 61 and the base station 6. These are included in an external communication terminal 60 that is disposed in the automobile 10. The external communication terminal 60 is a transmission device that is disposed in the automobile 10 and is a wireless terminal.

An internal communication device 71 is coupled to the internal communication ECU 28. The internal communication device 71 communicates with a mobile terminal of the occupant in the interior of the automobile 10 by near field wireless communication. The internal communication ECU 28 transmits and receives data to and from the mobile terminal of the occupant in the interior by using the near field wireless communication between the internal communication device 71 and the mobile terminal of the occupant. A terminal that can wirelessly communicate with the base station 6 of the wireless communication network 5 near the terminal basically suffices for the mobile terminal.

The travel ECU 24 controls the travelling automobile 10. The travel ECU 24 acquires the data from the external communication ECU 27, the detection ECU 26, and the driving operation ECU 25, for example, via the automobile network 36 and controls automatic driving or manual driving assistance for the travelling automobile 10. The travel ECU 24 generates travel control data for controlling the travelling automobile 10, based on the acquired data and outputs the travel control data to the drive ECU 21, the steering ECU 22, and the brake ECU 23. The drive ECU 21, the steering ECU 22, and the brake ECU 23 control the travelling automobile 10, based on the received travel control data.

Seat belt devices, airbag devices, and an occupant protection memory 87 are coupled to the occupant protection ECU 30. Examples of the seat belt devices include a driver seat belt device 81 for an occupant who drives the automobile 10 and a passenger seat belt device 82 for an occupant who gets in the automobile 10 together. Examples of the airbag devices include a driver front airbag device 83 that inflates in front of the occupant who drives the automobile 10, a driver curtain airbag device 84 that inflates outside the occupant who drives the automobile 10, a passenger front airbag device 85 that inflates in front of the occupant who gets in the automobile 10 together, and a passenger curtain airbag device 86 that inflates outside the occupant who gets in the automobile 10 together. These are included in an occupant protection device 80.

The occupant protection ECU 30 actuates or controls a seat belt device or an airbag device, based on information about the result of the collision detection or the information about the forecast for a collision with another object from the detection ECU 26.

The occupant protection memory 87 is a computer-readable storage medium and stores, for example, a program that is run by the occupant protection ECU 30 and settings. The occupant protection memory 87 may store information about the content of control implemented by the occupant protection ECU 30. The occupant protection ECU 30 reads the program in the occupant protection memory 87 and runs the program. This enables the occupant protection ECU 30 to function as an occupant protection control unit in the automobile 10.

The occupant protection ECU 30 that serves as the occupant protection control unit of the automobile 10 implements occupant protection control and collects and transmits the emergency information about the automobile 10, for example, in the case where a collision is detected. The occupant protection ECU 30 transmits the collected emergency information on the accident to the server apparatus 2 via the base station and the communication network 7 by using the external communication terminal 60.

Figure 3:
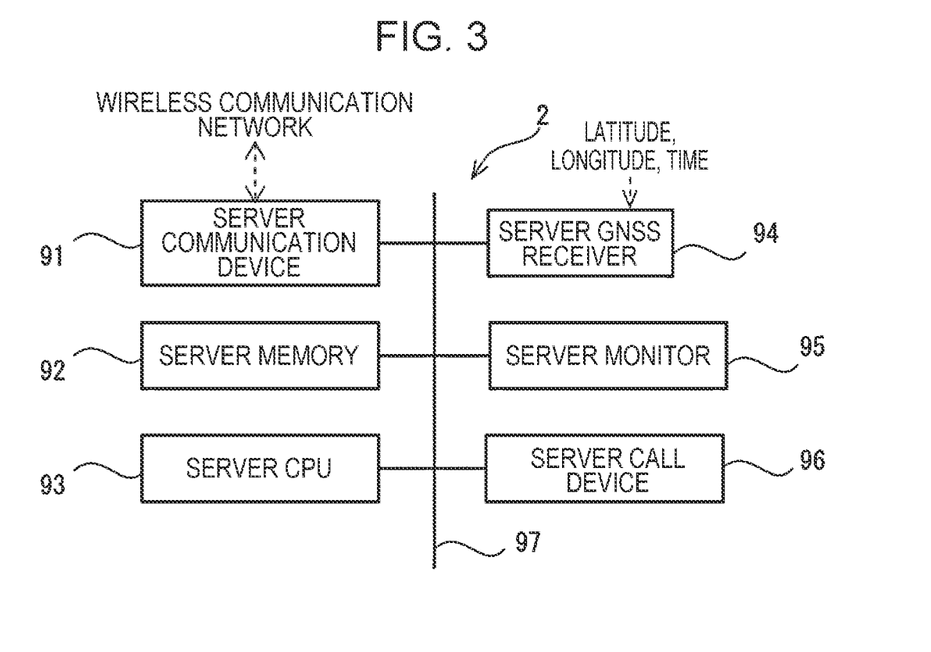
FIG. 3 illustrates a server apparatus that is used in a call center in FIG. 1.

FIG. 3 illustrates the server apparatus 2 that is used in the call center in FIG. 1.

The server apparatus 2 in FIG. 3 includes a server communication device 91, a server memory 92, a server CPU 93, a server GNSS receiver 94, a server monitor 95, a server call device 96, and a server bus 97 to which these are coupled.

The server communication device 91 is coupled to the communication network 7 of the wireless communication network 5. The server communication device 91 transmits and receives data to and from another device such as the external communication terminal 60 that is a wireless terminal of the automobile 10 or the client terminal 3 via the wireless communication network 5.

The server GNSS receiver 94 receives the radio waves of the GNSS satellites 110 and acquires the current time. The server apparatus 2 may include a server timer that is modified by using the current time of the server GNSS receiver 94 and that is not illustrated.

The server monitor 95 displays information for the server apparatus 2. For example, the server monitor 95 displays the emergency information that is received by the server apparatus 2 from the automobile 10 that has, for example, the accident.

The server call device 96 is used for a staff in the call center to call a user of a mobile terminal that is coupled by using the server communication device 91.

The server memory 92 is a computer-readable storage medium and stores, for example, a program that is run by the server CPU 93 and settings. The server memory 92 may store information about the content of control implemented by the server CPU 93. The server CPU 93 reads the program in the server memory 92 and runs the program. This achieves a server control unit in the server apparatus 2. The server CPU 93 that serves as the server control unit manages the entire operation of the server apparatus 2.

For example, when the server communication device 91 receives the emergency information that is immediately transmitted from each automobile 10 that has the accident, the server CPU 93 of the server apparatus 2 in the call center causes the server monitor 95 to display the received emergency information. The staff in the call center determines the status of the accident, based on the displayed emergency information about each automobile 10 and inputs the request for dispatch accordingly. The server CPU 93 transmits the request for dispatch to the client terminal 3 by using the server communication device 91.

Figure 4:
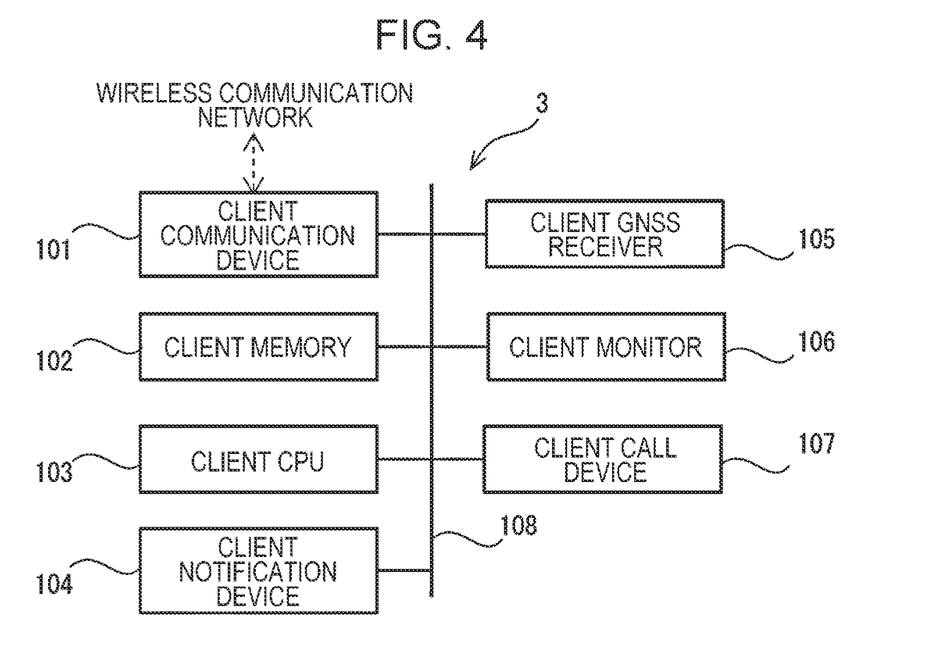
FIG. 4 illustrates a client terminal that is used by a squad in FIG. 1.

FIG. 4 illustrates the client terminal 3 that is used by the squad in FIG. 1.

The client terminal 3 in FIG. 4 includes a client communication device 101, a client memory 102, a client CPU 103, a client notification device 104, a client GNSS receiver 105, a client monitor 106, a client call device 107, and a client bus 108 to which these are coupled.

The client communication device 101 is coupled to the communication network 7 of the wireless communication network 5. The client communication device 101 transmits and receives data to and from another device such as the external communication device 61 that is a wireless terminal of the automobile 10 or the server apparatus 2 via the wireless communication network 5.

The client GNSS receiver 105 receives the radio waves of the GNSS satellites 110 and acquires the current time. The client terminal 3 may include a server timer that is modified by using the current time of the client GNSS receiver 105 and that is not illustrated.

The client monitor 106 displays information for the client terminal 3. For example, the client monitor 106 displays the request for dispatch that is received from the server apparatus 2.

The client notification device 104 outputs a sound for the request for dispatch to the members of the squad.

The client call device 107 is used for the members of the squad to call a user of a mobile terminal that is coupled by using the client communication device 101.

The client memory 102 is a computer-readable storage medium and stores, for example, a program that is run by the client CPU 103 and settings. The client memory 102 may store information about the content of control implemented by the client CPU 103. The client CPU 103 reads the program in the client memory 102 and runs the program. This achieves a client control unit in the client terminal 3. The client CPU 103 that serves as the client control unit manages the entire operation of the client terminal 3.

For example, when the client communication device 101 receives the request for dispatch, the client CPU 103 of the client terminal 3 of the life-saving squad reports the request for dispatch by using the client notification device 104. Consequently, the life-saving squad causes the ambulance 11 or the medical helicopter to rush to the site of the accident, based on the request for dispatch. The squad can be dispatched to the site of the accident with the state of the accident of each automobile 10 grasped. The squad can immediately provide, in short lead time, an appropriate life-saving treatment to a person who has the accident.

Figure 5:
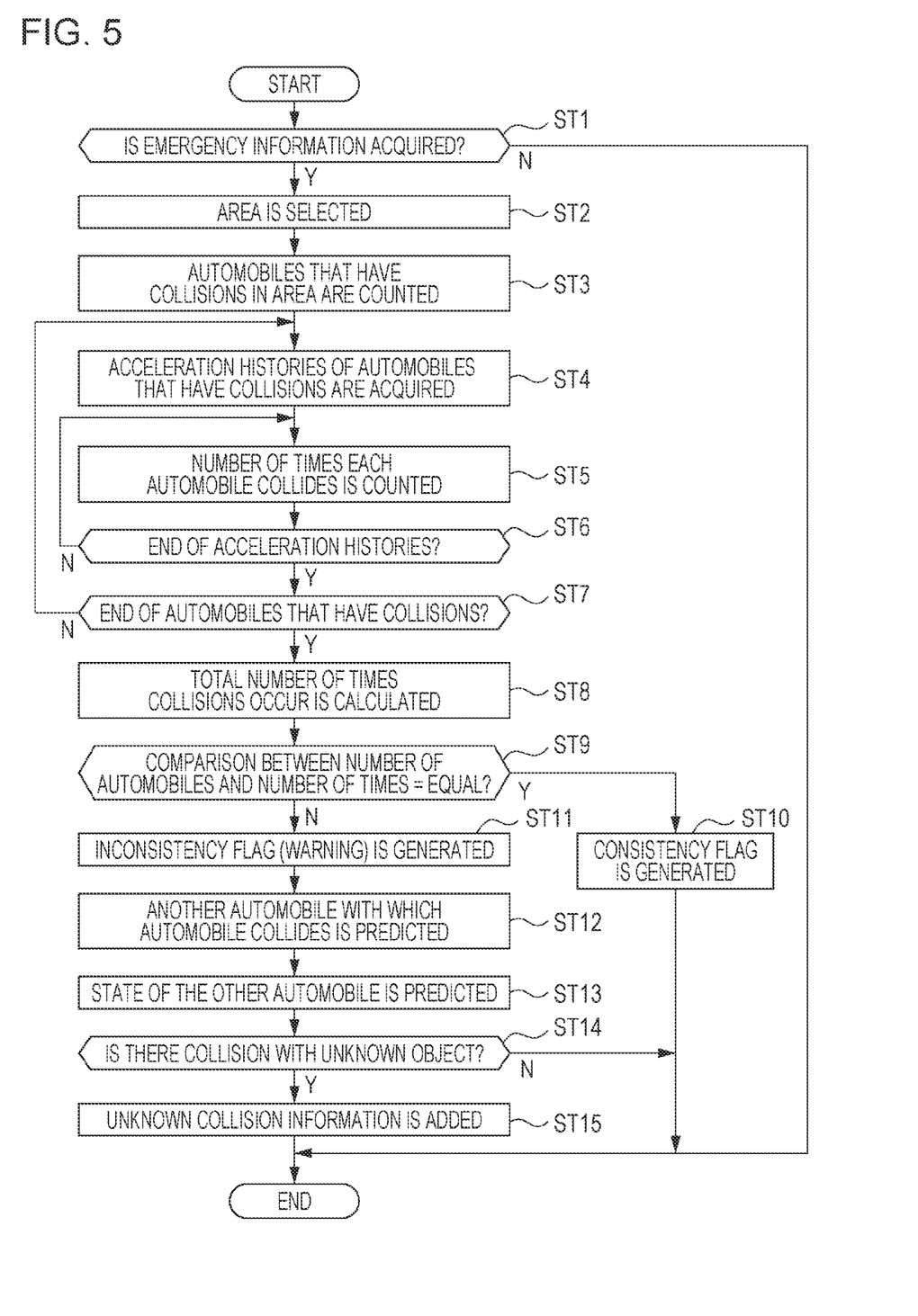
FIG. 5 is a flowchart of inconsistency determination processing for an automobile accident in the server apparatus that receives emergency information about automobiles that have accidents.

FIG. 5 is a flowchart of inconsistency determination processing for an automobile accident in the server apparatus 2 that receives pieces of the emergency information about the automobiles 10 that have the accidents.

The server CPU 93 of the server apparatus 2 in the call center that receives the pieces of the emergency information from the automobiles 10 that have the accidents periodically performs the inconsistency determination processing for the automobile accident in FIG. 5. In this way, the server apparatus 2 functions as an inconsistency-determining apparatus for the automobile accident.

At a step ST1, the server CPU 93 of the server apparatus 2 determines whether the emergency information on the accident is received and acquired from each automobile 10 that has the accident. When the accident occurs, the server apparatus 2 receives the respective pieces of the emergency information from the automobiles 10 that have the accidents. The pieces of the emergency information may include speed histories or acceleration histories before and after the accident and the data of images of the interior and the exterior that are imaged right after the accident for every collision in addition to the information on the accident based on an AACN standard such as the location and time of the accident, the direction in which an impact is taken in the accident, the intensity of the impact, and the operating state of the occupant protection device 80 in the accident. The pieces of the emergency information also include identification information about the respective automobiles 10. If the emergency information on the accident is received, the processing proceeds to a step ST2. If the emergency information on the accident is not received at all, the server CPU 93 ends this process.

At the step ST2, the server CPU 93 divides the acquired pieces of the emergency information for areas corresponding to the range of the accident, and a single area is selected for a process described below. Accidents on roads typically do not frequently occur at the same time but occur at locations at the same time in some cases. The server CPU 93 may distinguish a single accident from the other accidents to determine inconsistency in the automobile accident. For this reason, the server CPU 93 may divide the acquired pieces of the emergency information into respective accidents. For example, the server CPU 93 may divide the pieces of the emergency information for the areas, for example, based on the cell range of each base station 6 via which the emergency information is transmitted.

At a step ST3, the server CPU 93 specifies the automobiles from which the pieces of the emergency information representing that the accidents occur due to the collisions are acquired from all of the automobiles 10 in the selected area and counts the number of the automobiles 10 that have the collisions. This enables the server CPU 93 to acquire the total number of the colliding automobiles regarding all of the automobiles 10 that are specified as automobiles that have the collisions in the selected area.

At a step ST4, the server CPU 93 acquires the acceleration histories in the accidents of the automobiles 10 that are specified as the automobiles that have the collisions at the step ST3. The acceleration histories in the accidents of the automobiles 10 are included in the pieces of the emergency information that are transmitted from the automobiles 10 for respective collisions. In the case where there are pieces of the emergency information including the same identification information, the server CPU 93 may generate and acquire the acceleration history in the accident of each automobile 10 by combining the acceleration histories that are included therein in chronological order. The acceleration histories of the automobiles 10 include information about changes in the acceleration due to the collisions of the automobiles 10. The server CPU 93 may acquire the speed histories in the accidents of the automobiles 10. The speed histories in the accidents of the automobiles 10 include information about changes in the speed due to the collisions of the automobiles 10. The server CPU 93 may acquire information about the collisions after the automobiles 10 detect the collisions. Such information is information about the number of times the collisions occur or information that enables the number of times to be specified.

At a step ST5, the server CPU 93 counts the number of times each automobile 10 collides. The server CPU 93 determines a collision that is represented in the acceleration history in the accident of the automobile 10 and counts up the number of times the collision occurs. This enables the server CPU 93 that serves as a counter to count the number of times the automobile 10 that has the accident collides from the acquired information about the changes in the speed or information about the changes in the acceleration of the automobile 10.

At a step ST6, the server CPU 93 determines whether the process regarding the acquired acceleration histories of the automobiles 10 is performed until the end. If the process regarding the acceleration histories is not performed until the end, the server CPU 93 returns the processing to the step ST5. If the process regarding the acceleration histories is performed until the end, the processing proceeds to a step ST7. This enables the server CPU 93 to count the number of times each automobile 10 that has the accident collides.

At the step ST7, the server CPU 93 determines whether the process regarding all of the automobiles 10 that are specified as the automobiles that have the collisions in the selected area ends. If the process regarding all of the automobiles 10 does not end, the server CPU 93 returns the processing to the step ST4. The server CPU 93 counts the number of times the next automobile 10 collides in the area.

If the process regarding all of the automobiles 10 ends, the processing proceeds to a step ST8.

At the step ST8, the server CPU 93 calculates the total sum of the number of times the collisions occur regarding all of the automobiles 10 that are specified as the automobiles that have the collisions in the selected area. This enables the server CPU 93 to acquire the total number of times all of the automobiles 10 that are specified as the automobiles that have the collisions in the selected area collide.

In a process that starts at a step ST9, the server CPU 93 compares pieces of information about the automobiles 10 that have the accidents and specifically determines whether there is consistency in the entire information on the accidents.

Figure 8A:
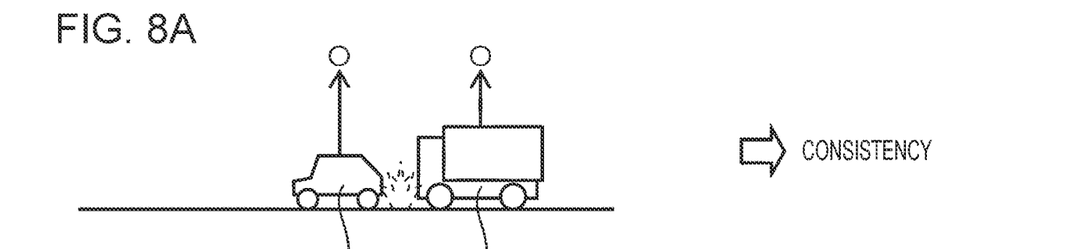
FIG. 8A to FIG. 8D illustrate specific examples of the accidents of the automobiles.

According to the present embodiment, the server CPU 93 compares the total number of the colliding automobiles with the total number of times the collisions occur regarding the colliding automobiles 10 that are specified as the automobiles that have the collisions in the selected area. In the case where a second automobile 10B hits a first automobile 10A as illustrated in FIG. 8A described later, each automobile 10 transmits the emergency information once. In this case, the total number of the colliding automobiles and the total number of times the collisions occur are 2 and are equal to each other. In the case where the automobiles 10 collide with each other, the total sum of the number of times the collisions occur is basically an even number. In the case where these are not equal to each other, the server CPU 93 determines that there is inconsistency and the processing proceeds to a step ST11. In the case of consistency, the processing proceeds to a step ST10.

At the step ST10, the total number of the colliding automobiles and the total number of times the collisions occur are equal to each other, and there is consistency. Accordingly, the server CPU 93 generates a consistency flag. The consistency flag may be stored in, for example, the server memory 92. The server monitor 95 displays that the total number of the colliding automobiles and the total number of times the collisions occur are equal to each other, and that there is consistency, based on the consistency flag. This enables the staff in the call center to predict that all of the pieces of the emergency information can be acquired from the automobiles 10. Subsequently, the server CPU 93 ends this process.

At the step ST11, the total number of the colliding automobiles and the total number of times the collisions occur are not equal to each other, and there is inconsistency. Accordingly, the server CPU 93 generates an inconsistency flag. This enables the server CPU 93 that serves as a generation unit to generate an inconsistency comparison result representing a possibility that an automobile 10 having an unknown collision exists in an accident area in the case where there is inconsistency in the number of times the automobiles 10 that have the accidents collide. The inconsistency flag may be stored in, for example, the server memory 92. The server monitor 95 displays that there is inconsistency such that the total number of the colliding automobiles and the total number of times the collisions occur are not equal to each other, based on the inconsistency flag. This enables the staff in the call center to grasp that not all of the pieces of the emergency information have been acquired from the automobiles 10.

At a step ST12, the server CPU 93 predicts another automobile 10 with which each automobile 10 collides. The server CPU 93 may predict the other automobile 10 with which the automobile 10 collides, based on acquired information about the other automobile 10 at the time at which the collisions of the automobiles 10 are counted.

For example, in the case where the acceleration or the speed of another automobile 10 at a timing of collision counting in the acceleration history or the speed history of each automobile 10 is equal to that of the automobile 10, the server CPU 93 may predict that the automobile 10 collides with the other automobile 10. The server CPU 93 that serves as a prediction unit can thus predict the other automobile 10 with which the automobile 10 collides by comparing the waveform of the acceleration itself or the waveform of the changes in the speed itself due to the collisions of the automobiles 10.

Other than this, for example, in the case where the emergency information about each automobile 10 includes image data that is acquired by imaging the exterior of the automobile, characteristics of another automobile 10 that is captured in the image such as the color and kind of the automobile may be compared with characteristics of the automobile 10 that are included in the emergency information about the other automobile 10, and it may be predicted that the automobile 10 collides with the other automobile 10 in the case where these match with each other. The server CPU 93 that serves as the prediction unit can thus predict the other automobile 10 with which the automobile 10 that has the accident collides by comparing characteristic information such as the kind and color of the automobiles that is included in the pieces of the emergency information that are acquired from the automobiles 10.

At a step ST13, the server CPU 93 predicts the state of the other automobile 10. The server CPU 93 may predict the state of the other automobile 10 and the state of an occupant therein, for example, based on the data of the images of the interior and the exterior that are included in the emergency information about the other automobile 10. Damage and injury cannot be determined by using final states but can be imagined by determining the states for every collision. As for the other automobile 10 with which the automobile 10 that is specified collides, the server CPU 93 that serves as the prediction unit can thus predict the position or state of the other automobile 10 or the state of the occupant therein from the emergency information about the other automobile 10.

At a step ST14, the server CPU 93 determines whether there is a collision with an unknown object. If the other automobile is not predicted at the step ST12, the server CPU 93 determines that the collision occurs against the unknown object and the processing proceeds to a step ST15. If the other automobile 10 can be predicted at step ST12, the server CPU 93 determines that the collision does not occur against the unknown object and ends this process.

At the step ST15, the server CPU 93 generates unknown collision information and adds the unknown collision information to the inconsistency flag. The unknown collision information may be information about the collision with the unknown object. The unknown collision information may be stored in, for example, the server memory 92 together with the inconsistency flag. The server monitor 95 displays the unknown collision information. This enables the staff in the call center to grasp at least which automobile 10 collides with another automobile 10 that cannot be predicted. Subsequently, the server CPU 93 ends this process.

The server CPU 93 can thus predict the presence of the automobile 10, the emergency information of which cannot be received, from contradiction in the number of times the collisions occur although the automobile 10 collides with another automobile 10. The inconsistency flag regarding the unknown collision information is acquired, and consequently, the staff in the call center or the squad can make preparation for dealing with the automobile 10 the emergency information of which cannot be received.

Figure 6:
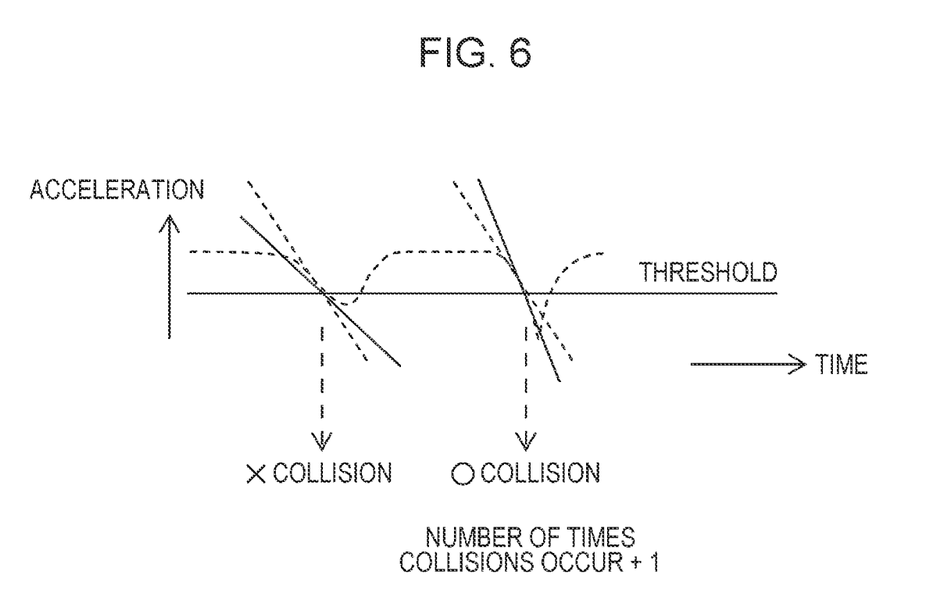
FIG. 6 illustrates information indicating an example of changes in acceleration that is included in the emergency information about one of the automobiles and an example of a method of counting the number of times each automobile collides, based on the information.

FIG. 6 illustrates information indicating an example of the changes in the acceleration that is included in the emergency information about one of the automobiles 10 and an example of a method of counting the number of times the automobile 10 collides, based on the information.

In FIG. 6, the acceleration history in the accident of the automobile 10 is illustrated by an acceleration curve. In FIG. 6, time elapses in the direction from the left to the right.

The acceleration curve in FIG. 6 has a first dimple that is gentle and that has a small change width and a second dimple that is sharp and that has a large change width. The two dimples extend below across a threshold that is set in an impossible range during normal travelling.

In this case, the server CPU 93 determines whether the first dimple is created due to a collision. The server CPU 93 first determines whether the change width is more than the threshold. Since the change width is more than the threshold, the server CPU 93 determines whether the magnitude of the changes in the acceleration in the course of a decrease in the acceleration is more than a threshold that is in the impossible range during normal travelling. Since the magnitude of the changes in the acceleration is not more than the threshold, the server CPU 93 determines that the first dimple of the acceleration curve is not created due to a collision. The server CPU 93 does not count up the number of times the collisions occur.

Subsequently, the server CPU 93 determines whether the second dimple is created due to a collision. In this case, the server CPU 93 determines that the change width is more than the threshold and determines that the magnitude of the changes in the acceleration is more than the threshold. The server CPU 93 determines that the second dimple is created due to a collision and counts up the number of times the collisions occur.

The server CPU 93 repeatedly makes such determination until the end of the curve of the changes in the acceleration. The server CPU 93 can specify the number of times the collisions occur regarding the automobile 10 related to the acceleration curve in FIG. 6.

The server CPU 93 that serves as the counter can thus count, as the number of times the collisions occur, the number of the changes in the acceleration or the speed that are impossible during normal travelling and that are not rapid changes that can occur for a collision with a stationary object such as a structure.

Figure 7:
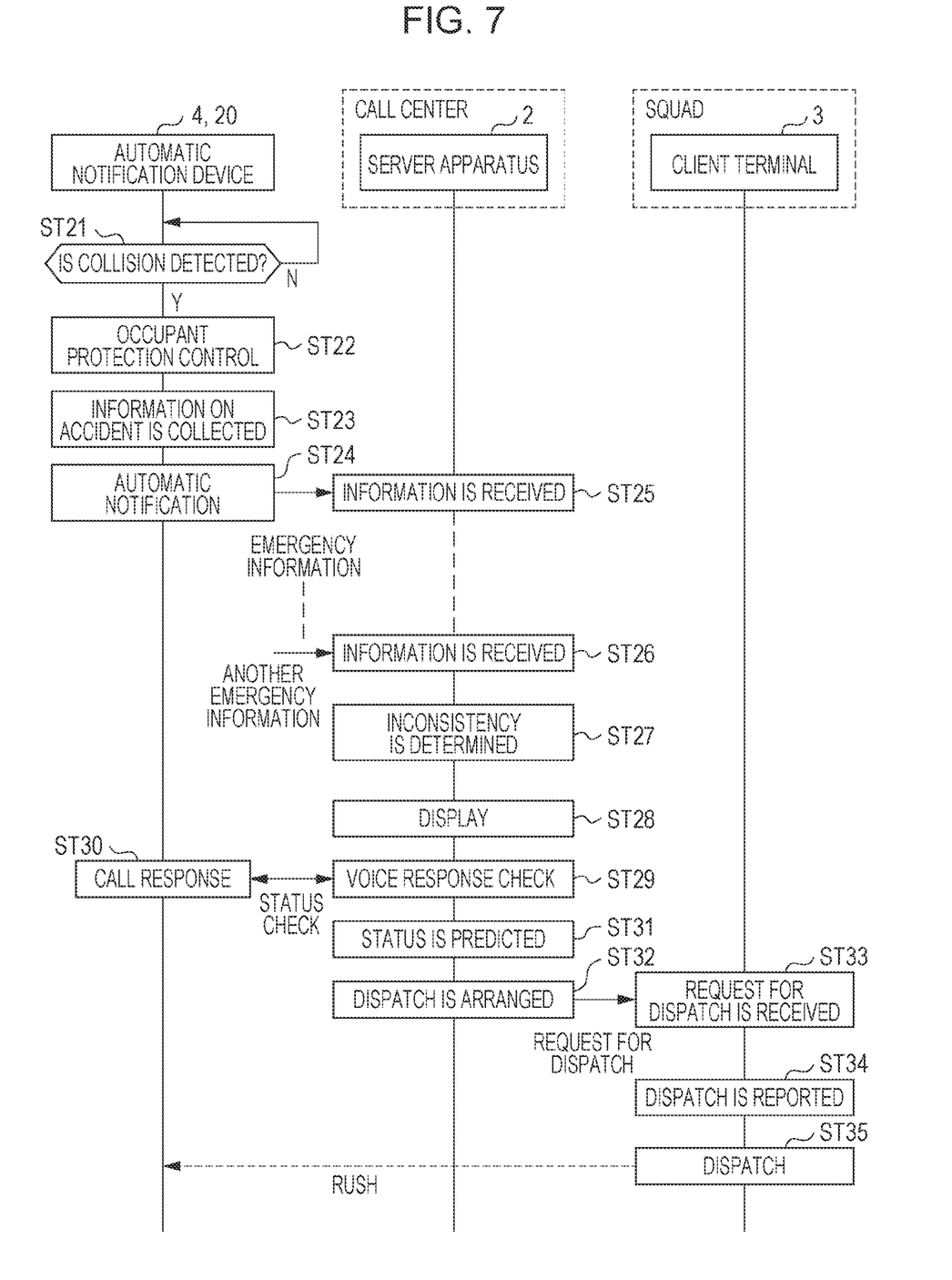
FIG. 7 is a sequence chart illustrating the flow of a series of processes ranging from an emergency notification from each automobile that has the accident to dispatch for first aid regarding the emergency notification system in FIG. 1.

FIG. 7 is a sequence chart illustrating the flow of a series of processes ranging from the emergency notification from each automobile 10 that has the accident and dispatch for first aid regarding the emergency notification system 1 in FIG. 1.

In FIG. 7, the control system 20 that serves as the automatic notification device 4 of the automobile 10, the server apparatus 2 in the call center, and the client terminal 3 of the squad are illustrated. Time elapses in the direction from above to below.

At a step ST21, the detection ECU 26 of the automobile 10 detects the collision of the automobile 10. The detection ECU 26 detects the collision, for example, when the magnitude of the acceleration that is detected by the three-axis acceleration sensor 52 is more than a predetermined threshold. While no collision is detected, the detection ECU 26 repeatedly performs this process. When the collision is detected, the detection ECU 26 transmits collision detection information to the occupant protection ECU 30 and the processing proceeds to a step ST22. The detection ECU 26 may end this process in the case where no collision is forecasted when a certain period of time has elapsed after this process starts.

The detection ECU 26 may forecast that a collision cannot be avoided before the collision is detected. The occupant protection ECU 30 may perform a pre-process for occupant protection before the collision is detected, based on the forecast that the collision cannot be avoided. The occupant protection ECU 30 may perform the pre-process, for example, by tightening the seat belt of a seat belt device into a tension state or by performing another process. For example, the occupant protection ECU 30 may cause an airbag device to pre-inflate.

At the step ST22, the occupant protection ECU 30 of the automobile 10 that detects the collision performs an occupant protection process, based on the collision detection information. The occupant protection ECU 30 may perform the occupant protection process, based on information about collision forecast made by the detection ECU 26.

At a step ST23, the occupant protection ECU 30 of the automobile 10 that implements the occupant protection control collects the emergency information on the accident. Basically, the emergency information on the accident may be information that is collected by the AACN described above. According to the AACN, the emergency information such as the operating state of the occupant protection device 80 in the accident, position, the direction in which an impact is taken in the accident, and the intensity of the impact is collected. For example, the occupant protection ECU 30 collects information about the magnitude and direction of the acceleration of each collision in the accident that is detected by the three-axis acceleration sensor 52, information about position and time in the accident that is generated by the GNSS receiver 56, and information about the seat belt device and the airbag device that are actuated by the occupant protection ECU 30.

At a step ST24, the external communication ECU 27 of the automobile 10 gives an automatic notification for the emergency information that is collected by the occupant protection ECU 30 by using the external communication device 61.

The external communication ECU 27 may collect and transmit the emergency information.

At a step ST25, the server communication device 91 of the server apparatus 2 in the call center receives automatic notification information that is received from the automobile that has the accident. The automatic notification information that is received by the server communication device 91 may be stored in the server memory 92.

At a step ST26, the server communication device 91 of the server apparatus 2 in the call center receives the automatic notification information from another automobile 10 that has the accident. The information about the other automatic notification that is received by the server communication device 91 may be stored in the server memory 92.

At a step ST27, the server CPU 93 of the server apparatus 2 in the call center performs the inconsistency determination processing for the automobile accident in FIG. 5. Consequently, the inconsistency flag or the consistency flag is stored in the server memory 92.

At a step ST28, the server CPU 93 of the server apparatus 2 in the call center causes the server monitor 95 to display the automatic notification information that is received by the server communication device 91 and the result of inconsistency determination for the automobile accident. The staff in the call center can check the status of the accident of the automobile 10, based on the emergency information on the accident that is displayed on the server monitor 95. The scale of the accident, for example, can be determined based on the result of the inconsistency determination for the automobile accident and the pieces of the emergency information on the accident of the automobiles 10. In particular, the inconsistency flag enables a possibility that there is an unidentified collision or an unidentified vehicle that has the accident to be grasped.

At a step ST29, the server CPU 93 of the server apparatus in the call center communicates with the external communication ECU 27 of the automobile 10 that has the accident. At a step ST30, the occupant protection ECU 30 of the automobile 10 responds to a voice call. Consequently, a call line through which a call can be made is established between the server call device 96 and, for example, the microphone 55 of the automobile 10. The staff in the call center checks the safety and health of each occupant by using a voice. This enables states such as the degree of injury of the occupant in the automobile 10 that has the accident to be directly checked. The staff in the call center may input the result of checking into the server apparatus 2.

At a step ST31, the server CPU 93 of the server apparatus 2 in the call center predicts the status. The server CPU 93 may predict the status, based on the automatic notification information that is received by the server communication device 91, the result of the inconsistency determination for the automobile accident, and information that is inputted by the staff in the call center. The server CPU 93 may check emergency information about past accidents and may predict the status by performing an artificial intelligence process. The staff in the call center may comprehensively consider and predict the status and may input the result of prediction into the server apparatus 2. The server CPU 93 may predict the status in chronological order such that the flow of the occurrence of the multiple accidents is organized. The server CPU 93 may predict the position and state of the automobile 10 in the collision and the state of the occupant.

At a step ST32, the server CPU 93 of the server apparatus 2 in the call center arranges dispatch. The server CPU 93 transmits the request for dispatch to the client terminal 3 of the squad by using the server communication device 91. The server CPU 93 may transmit the request for dispatch, based on the operation of the staff in the call center.

At a step ST33, the client communication device 101 of the client terminal 3 of the squad receives the request for dispatch from the server apparatus 2. The request for dispatch that is received by the client communication device 101 may be stored in the client memory 102.

At a step ST34, the client CPU 103 of the client terminal of the squad reports the dispatch. The client CPU 103 outputs a sound for the request for dispatch from the client notification device 104, based on the fact that the client communication device 101 receives the request for dispatch. The client CPU 103 may cause the client monitor 106 to display a screen for the request for dispatch. The automatic notification information, the result of the inconsistency determination for the automobile accident, and the information that is inputted by the staff in the call center may be displayed on the screen for the request for dispatch.

At a step ST35, the members of the squad are dispatched. The sound for the request for dispatch and the screen for the request for dispatch enable the members of the squad to grasp the presence of the request for dispatch to the squad and enable the emergency dispatch by using the medical helicopter or the ambulance 11.

Consequently, the medical helicopter or the first aid squad can be dispatched in the minimum lead time without delay, based on the emergency information on the accident that is automatically transmitted from each automobile 10 that has the accident. The emergency dispatch of the medical helicopter or the first aid squad can be achieved with appropriate preparation made based on the emergency information on the accident that is acquired in advance. In particular, the presence/absence of an automobile 10 that has an unknown accident can be grasped based on the result of the inconsistency determination for the automobile accident, and consequently, the emergency dispatch of the medical helicopter or the first aid squad can be achieved with preparation for dealing with this made. There is an increased possibility that a person who has the accident is saved.

According to the present embodiment, the emergency notification system 1 in which the emergency information about the accident is able to be transmitted from each of the automobiles 10 that have the accidents includes the inconsistency-determining apparatus for the accident of the automobile 10, as described above. The inconsistency-determining apparatus for the accident of the automobile 10 acquires, as the pieces of the emergency information about the automobiles 10 that have the accidents, the information about the number of times each automobile 10 collides or the information with which the number of times is able to be specified, counts the number of times each automobile 10 that has the accident collides, and compares the number of times one automobile 10 that has the accident with that of another automobile 10 for every predetermined accident area that is grasped from the position of the automobiles 10. In the case where there is inconsistency in the number of times the automobiles 10 that have the accidents collide, the inconsistency comparison result representing a possibility that an automobile 10 having an unknown collision exists in the accident area is generated. A possibility that there is an automobile 10 that cannot transmit the emergency information in the accident area or that there is an automobile 10 that has not completely transmitted the emergency information can be warned. According to the present embodiment, the presence of the automobile 10 that cannot transmit the emergency information or the automobile 10 that has not completely transmitted the emergency information can thus be warned based on the contradiction in the counted value of the number of times the collisions occur. The life-saving squad such as a fire department appropriately determines, for example, the scale or status of the multiple accidents including a possibility of an uncertain collision and a countermeasure thereof for preparation, based on the comparison result of the inconsistency-determining apparatus for the accident of the automobile 10 and can rush to the site of the accident with a first aid organization.

The inconsistency-determining apparatus for the vehicle accident enables the emergency notification system 1 to determine the status of the accident with more certainty.

According to the present embodiment, the inconsistency-determining apparatus acquires, as the information about the number of times each automobile 10 collides or the information that enables the number of times to be specified, the information about the changes in the acceleration or the information about the changes in the speed in the accident of the automobile 10 and counts the number of times the automobile 10 collides from the acquired information about the changes in the speed or information about the changes in the acceleration of the automobile 10. At this time, the inconsistency-determining apparatus counts, as the number of times the collisions occur, the number of the changes in the acceleration or the speed that are impossible during normal travelling and that are not rapid changes that can occur for a collision with a stationary object such as a structure. This enables the inconsistency-determining apparatus to count the collisions between the automobiles 10 with more certainty.

According to the present embodiment, the inconsistency-determining apparatus compares the total sum of the number of times each automobile 10 that has the accident collides with an odd number or an even number and generates the inconsistency comparison result representing a possibility that an automobile 10 having an unknown collision exists in the case where the total sum of the number of times each automobile 10 that has the accident collides is the odd number. This enables the inconsistency-determining apparatus to readily determine, with certainty, the possibility that an automobile 10 having an unknown collision exists.

According to the present embodiment, the inconsistency-determining apparatus predicts another automobile 10 with which each automobile 10 that has the accident collides by comparing the pieces of the emergency information about the automobiles 10 that have the accidents. At this time, the inconsistency-determining apparatus may predict the other automobile 10 with which the automobile 10 collides by using, for example, the characteristic information that is included in the pieces of the emergency information about the automobiles 10 that have the accidents for specifying the other automobile 10 in the collision. The other automobile 10 with which the automobile 10 collides may be predicted by comparing the waveform of the acceleration itself or the waveform of the changes in the speed itself due to the collisions of the automobiles 10. In the case where the other automobile 10 is not predicted for a collision, the inconsistency-determining apparatus generates information about the collision as a collision comparison result. In the case where the other automobile 10 is predicted for every collision, the inconsistency comparison result includes no collision information. This enables the inconsistency-determining apparatus to determine the possibility that there is an automobile 10 that has an unknown collision in the accident area and enables the inconsistency-determining apparatus to specify the inconsistency in the collisions of the automobiles 10.

As for the other automobile 10 with which the automobile that is specified collides, the inconsistency-determining apparatus may predict the position or state of the other automobile 10 or the state of the occupant therein from the emergency information about the other automobile 10. This enables information about the position or state of each automobile 10 that has the accident or the state of the occupant therein to be acquired with more certainty.

According to the embodiment described above, the server CPU 93 determines overall consistency in the emergency information on the accident by comparison between the total number of the colliding automobiles and the total number of times the collisions occur at the step ST3 to the step ST15 in FIG. 5 for determination.

At this time, the server CPU 93 may specify whether each automobile 10 collides with a vehicle or may acquire specification information from the automobile 10. The server CPU 93 or the automobile 10 may specify whether the automobile collides with a vehicle, based on an image captured by a camera that is disposed therein or increase or decrease in the acceleration sensor. For example, the direction of momentum in the detected waveform of the acceleration sensor or how the momentum increases or decreases differs between the case where the automobile 10 collides with another automobile 10 and the case where the automobile 10 collides with a structure. In some cases, the object with which the automobile 10 collides appears in the image captured by the automobile 10. The server CPU 93 or the automobile 10 may specify the object, based on the increase or decrease in the acceleration sensor or the captured image. In the case where the automobile 10 collides with an object other than the other automobile 10, in consideration for this, the server CPU 93 may collate the total number of the colliding automobiles and the total number of times the collisions occur and may determine whether the emergency information on the accident is entirely consistent. For example, the server CPU 93 may subtract the number of times each automobile 10 collides with an object other than the other automobile 10 from the total number of times the collisions occur and may determine whether the subtracted value and the total number of the colliding automobiles are equal to each other.

FIG. 8A to FIG. 8D illustrate specific examples of the accidents of the automobiles 10.

FIG. 8A illustrates an example in which the automobile 10B hits the automobile 10A. In this case, the automobile 10A and the automobile 10B may transmit the emergency information to the server apparatus 2.

In this case, the total number of the colliding automobiles and the total number of times the collisions occur regarding the colliding automobiles 10 that have the accidents and that transmit the emergency information are 2. The server CPU 93 compares the total number of the colliding automobiles and the total number of times the collisions occur and determines that there is consistency therebetween.

Figure 8B:
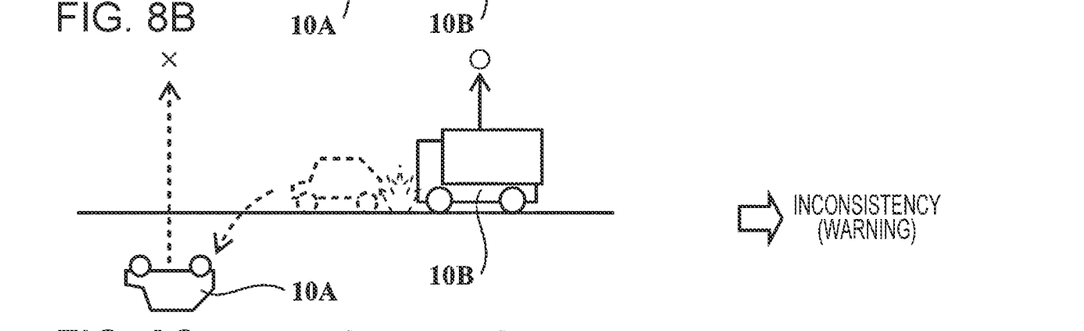

FIG. 8B illustrates an example in which the automobile 10B hits the automobile 10A, and the hit automobile 10A deviates from a road, collides alone, and rolls over. In this case, the automobile 10A may transmit emergency information representing that the automobile 10B hits the automobile 10A and emergency information representing that the automobile 10A collides alone to the server apparatus 2.

However, the automobile 10A in FIG. 8B cannot transmit the emergency information. The total number of the colliding automobiles and the total number of times the collisions occur regarding the colliding automobiles 10 that have the accidents and that transmit the emergency information are 1.

In this case, when the total number of the colliding automobiles and the total number of times the collisions occur are compared for determination, the server CPU 93 may determine that there is inconsistency between the total number of the colliding automobiles and the total number of times the collisions occur in the case where the total number of the colliding automobiles and the total number of times the collisions occur are an odd number and are equal to each other. As for the automobile 10B, the determination of the inconsistency enables a possibility of a rear-end accident in which an object other than the automobile 10B hits the automobile 10A to be warned. When the total number of the colliding automobiles and the total number of times the collisions occur are compared for determination, the server CPU 93 may determine that there is consistency between the total number of the colliding automobiles and the total number of times the collisions occur in the case where the total number of the colliding automobiles and the total number of times the collisions occur are an even number and are equal to each other.

Figure 8C:
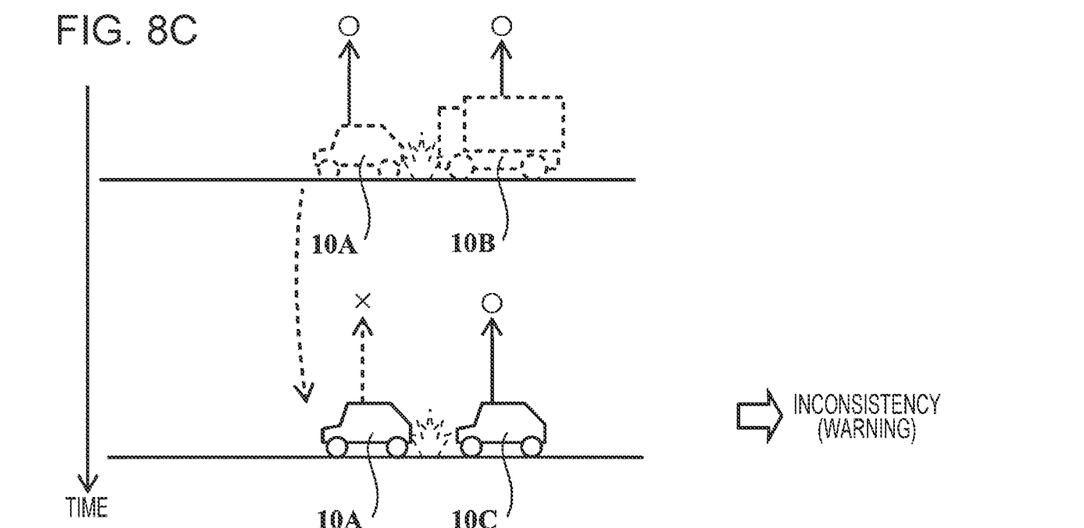

FIG. 8C illustrates an example in which the automobile 10B hits the automobile 10A, and subsequently, an automobile 10C hits the automobile 10A. In this case, the automobile 10A may transmit the emergency information representing that the automobile 10B hits the automobile 10A and emergency information representing that the automobile 10C hits the automobile 10A to the server apparatus 2.

However, the automobile 10A in FIG. 8C cannot transmit the emergency information representing that the automobile 10C hits the automobile 10A after the automobile 10B hits the automobile 10A. The total number of the colliding automobiles and the total number of times the collisions occur regarding the colliding automobiles 10 that have the accidents and that transmit the emergency information are 3.

In this case, when the total number of the colliding automobiles and the total number of times the collisions occur are compared for determination, the server CPU 93 may determine that there is inconsistency between the total number of the colliding automobiles and the total number of times the collisions occur in the case where the total number of the colliding automobiles and the total number of times the collisions occur are an odd number and are equal to each other. For example, as for the automobile 10A, the determination of the inconsistency enables a possibility of a rear-end accident in which an object other than the automobile 10B hits the automobile 10A to be warned. When the total number of the colliding automobiles and the total number of times the collisions occur are compared for determination, the server CPU 93 may determine that there is consistency between the total number of the colliding automobiles and the total number of times the collisions occur in the case where the total number of the colliding automobiles and the total number of times the collisions occur are an even number and are equal to each other.

Figure 8D:
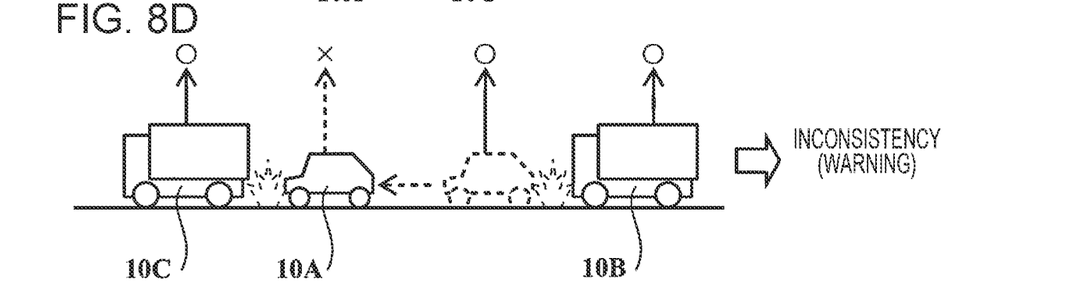

FIG. 8D illustrates an example in which the automobile 10B hits the automobile 10A, and the hit automobile 10A hits the automobile 10C. In this case, the automobile 10A may transmit emergency information on the accident regarding two collisions of the collision with the automobile 10B and the collision with the automobile 10C to the server apparatus 2.

Thereafter, however, the hit automobile 10A cannot appropriately transmit the emergency information to the server apparatus 2. The total number of the colliding automobiles and the total number of times the collisions occur regarding the colliding automobiles 10 that have the accidents and that transmit the emergency information are 3.

In this case, when the total number of the colliding automobiles and the total number of times the collisions occur are compared for determination, the server CPU 93 may determine that there is inconsistency between the total number of the colliding automobiles and the total number of times the collisions occur in the case where the total number of the colliding automobiles and the total number of times the collisions occur are an odd number and are not equal to each other. For example, as for the automobile 10A, the determination of the inconsistency enables a possibility of a rear-end accident in which an object other than the automobile 10B hits the automobile 10A to be warned. When the total number of the colliding automobiles and the total number of times the collisions occur are compared for determination, the server CPU 93 may determine that there is consistency between the total number of the colliding automobiles and the total number of times the collisions occur in the case where the total number of the colliding automobiles and the total number of times the collisions occur are an even number and are equal to each other.

The embodiment described above is an example of embodiments of the disclosure. However, the embodiment of the disclosure is not limited thereto, and various modifications or alterations can be made without departing from the spirit of the embodiment of the disclosure.

According to the embodiment described above, there are the divided ECUs in each automobile 10. However, some or all of these may be integrated into a single ECU.

According to the embodiment described above, the server CPU 93 counts the number of times the collisions occur, based on the acceleration histories of the automobiles 10, that is, the changes in the acceleration.

Other than this, for example, the server CPU 93 may count the number of times the collisions occur, based on the speed histories of the automobiles 10 or the data of images that are captured in the automobiles 10 for every collision.

The server apparatus 2 illustrated in FIG. 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the server apparatus 2 including the server communication device 91, the server memory 92, the server CPU 93, the server GNSS receiver 94, the server monitor 95, the server call device 96, and the server bus 97. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 3.

The invention claimed is:

1. An inconsistency-determining apparatus included in an emergency notification system to which emergency information about a vehicular accident is automatically transmitted from each vehicle that has been involved in the vehicular accident when a collision is detected by a respective vehicle, or in a case of multiple collisions detected by the respective vehicle, the emergency information is automatically transmitted multiple times for every collision from the respective vehicle, the inconsistency-determining apparatus comprising:

an acquisition unit configured to acquire (1) an area where the vehicular accident has occurred, (2) a number of times each vehicle has collided in the vehicular accident, (3) a total number of vehicles that have been involved in the vehicular accident, and (4) a total number of collisions that have occurred in the vehicular accident, based on the emergency information from the vehicle;

a comparator configured to compare the total number of collisions with the total number of vehicles;

a determination unit configured to determine that there is inconsistency between the total number of collisions and the total number of vehicle in response to comparing the total number of collisions with the total number of vehicles; and a generation unit configured to generate an inconsistency comparison result representing a possibility that a vehicle not having transmitted emergency information exists in the vehicular accident in the area in response to determining that there is inconsistency.

2. The inconsistency-determining apparatus according to claim 1, wherein collisions in the total number of collisions include a first collision between or among the vehicles and a second collision between one of the vehicles and an unknown object, the generation unit is configured to generate the inconsistency comparison result including information regarding the second collision.

3. The inconsistency-determining apparatus according to claim 2, wherein when (1) the total number of collisions and the total number of vehicles are odd numbers and (2) the determination unit determines that the total number of collisions matches the total number of vehicles in response to comparing the total number of collisions with the total number of vehicles, the generation unit is configured to generate the inconsistency comparison result.

4. The inconsistency-determining apparatus according to claim 2, further comprising a prediction unit configured to identify a collision in which only one of the vehicles has been involved in the vehicular accident in the area, based on the emergency information from the vehicles, in response to determining that there is inconsistency,
wherein the generation unit is configured to generate the inconsistency collision comparison result including information regarding the collision in which only one of the vehicles has been involved.

5. The inconsistency-determining apparatus according to claim 3, further comprising a prediction unit configured to identify a collision in which only one of the vehicles has been involved in the vehicular accident in the area, based on the emergency information from the vehicles, in response to determining that there is inconsistency,
wherein the generation unit is configured to generate the inconsistency collision comparison result including information regarding the collision in which only one of the vehicles has been involved.

6. The inconsistency-determining apparatus according to claim 1, wherein when (1) the total number of collisions and the total number of vehicles are odd numbers and (2) the determination unit determines that the total number of collisions matches the total number of vehicles in response to comparing the total number of collisions with the total number of vehicles, the generation unit is configured to generate the inconsistency comparison result.

7. The inconsistency-determining apparatus according to claim 6, further comprising a prediction unit configured to identify a collision in which only one of the vehicles has been involved in the vehicular accident in the area, based on the emergency information from the vehicles, in response to determining that there is inconsistency,
wherein the generation unit is configured to generate the inconsistency collision comparison result including information regarding the collision in which only one of the vehicles has been involved.

8. The inconsistency-determining apparatus according to claim 1, further comprising a prediction unit configured to identify a collision in which only one of the vehicles has been involved in the vehicular accident in the area, based on the emergency information from the vehicles, in response to determining that there is inconsistency,
wherein the generation unit is configured to generate the inconsistency collision comparison result including information regarding the collision in which only one of the vehicles has been involved.

9. An inconsistency-determining apparatus included in an emergency notification system to which emergency information about a vehicular accident is automatically transmitted from each vehicle that has been involved in the vehicular accident when a collision is detected by a respective vehicle, or in a case of multiple collisions detected by the respective vehicle, the emergency information is automatically transmitted multiple times for every collision from the respective vehicle, the inconsistency-determining apparatus comprising:
circuitry configured to:
acquire (1) an area where the vehicular accident has occurred, (2) a number of times each vehicle has collided in the vehicular accident, (3) a total number of vehicles that have been involved in the vehicular accident, and (4) a total number of collisions that have occurred in the vehicular accident, based on the emergency information from the vehicle;
compare the total number of collisions with the total number of vehicles;
determine that there is inconsistency between the total number of collisions and the total number of vehicle in response to comparing the total number of collisions with the total number of vehicles; and
generate an inconsistency comparison result representing a possibility that a vehicle not having transmitted emergency information exists in the vehicular accident in the area in response to determining that there is inconsistency.

* * * * *